United States Patent [19]
Maekawa et al.

[11] 4,035,538
[45] July 12, 1977

[54] CORE BLOCK FOR PLYWOOD AND METHOD AND APPARATUS FOR FORMING SAME

[75] Inventors: Sachio Maekawa, Aichi; Tadashi Aizawa, Nagoya, both of Japan

[73] Assignee: Hashimoto Denki Co., Ltd., Japan

[21] Appl. No.: 631,464

[22] Filed: Nov. 12, 1975

[30] Foreign Application Priority Data

| Nov. 26, 1974 | Japan | 49-135118 |
| Feb. 17, 1975 | Japan | 50-18786 |
| Feb. 17, 1975 | Japan | 50-18787 |

[51] Int. Cl.² ............ B32B 3/28; B32B 31/18
[52] U.S. Cl. ............ 428/155; 156/257; 156/227; 428/181; 428/537
[58] Field of Search ....... 428/105, 136, 181, 182, 428/186, 537, 155, 106–121; 156/257, 207, 210, 297

[56] References Cited
U.S. PATENT DOCUMENTS

| 1,819,775 | 8/1931 | Elmendorf | 428/155 |
| 2,581,421 | 1/1952 | Lombard et al. | 428/130 |
| 3,461,013 | 8/1969 | Gewiss | 156/210 |
| 3,624,161 | 11/1971 | Bub | 428/155 |

*Primary Examiner*—George F. Lesmes
*Assistant Examiner*—P. J. Thibodeau
*Attorney, Agent, or Firm*—Wenderoth, Lind & Ponack

[57] ABSTRACT

A thin wood sheet is folded in a zig-zag manner to have substantially the same height and provided with cuts partially extending in the wood sheet at the folded outer end portions along the grain direction thereof.

Before the wood sheet is folded in a zig-zag manner, the thin wood sheet is shaped in a wave form and partially cut at the top and bottom of the wave form along the grain direction.

1 Claim, 8 Drawing Figures

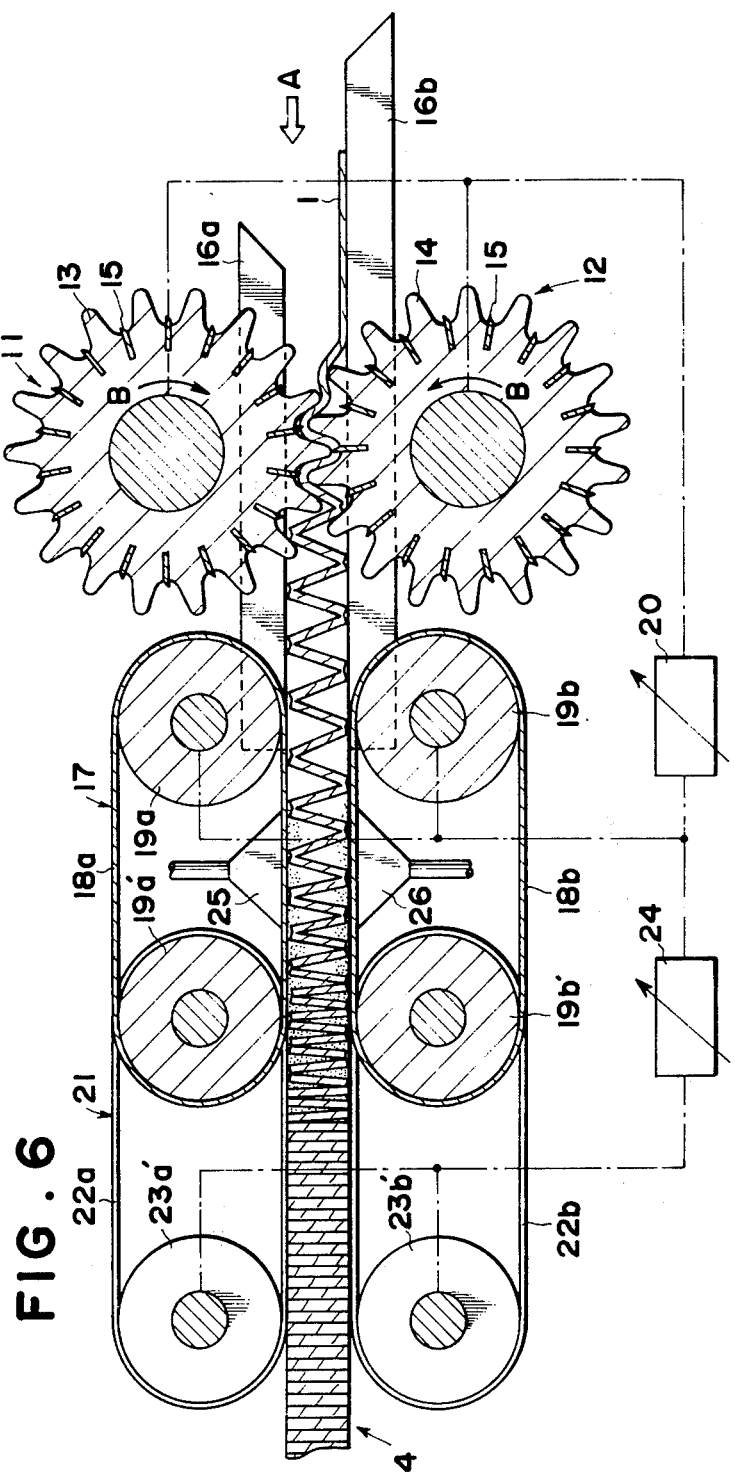

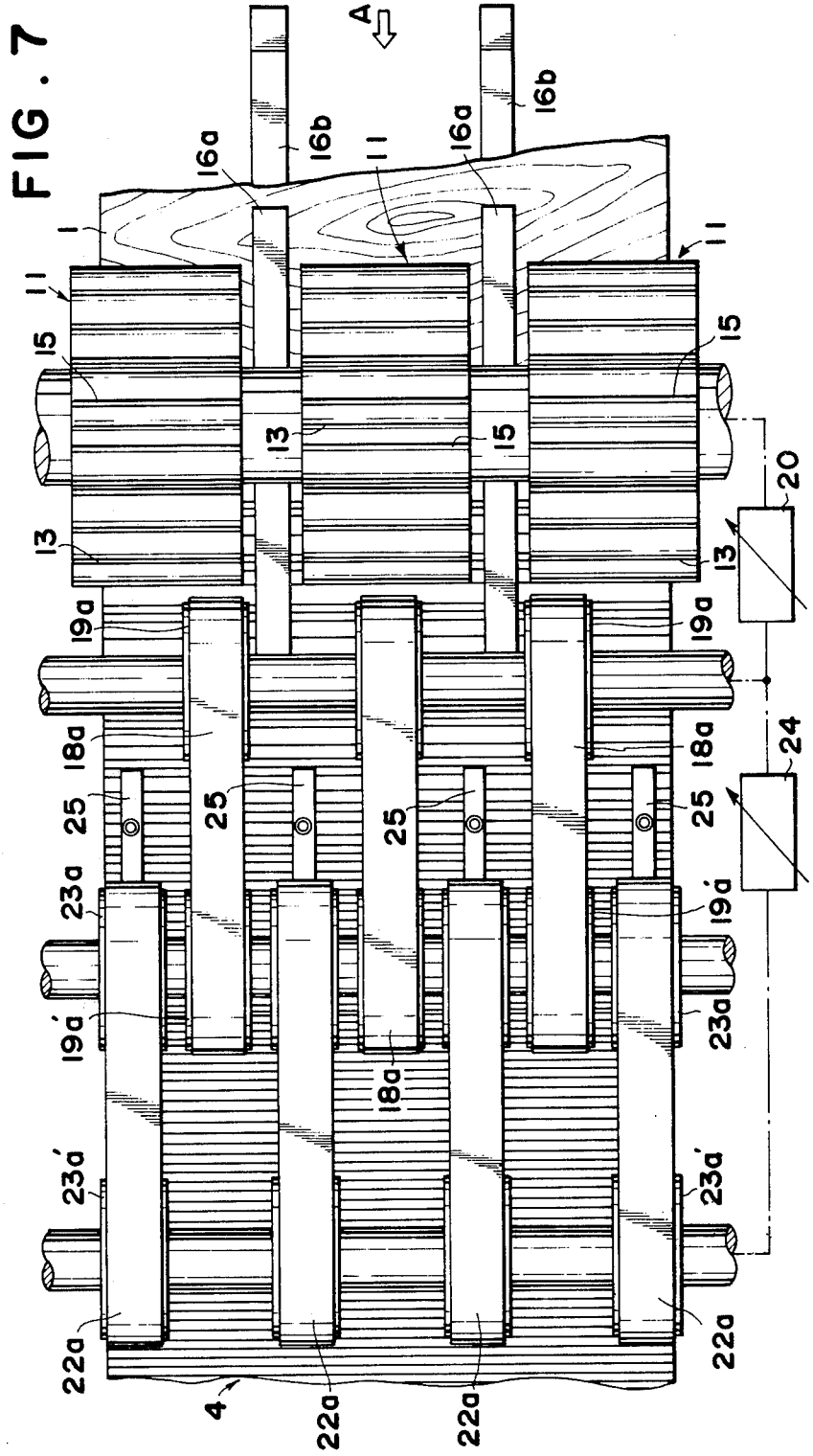

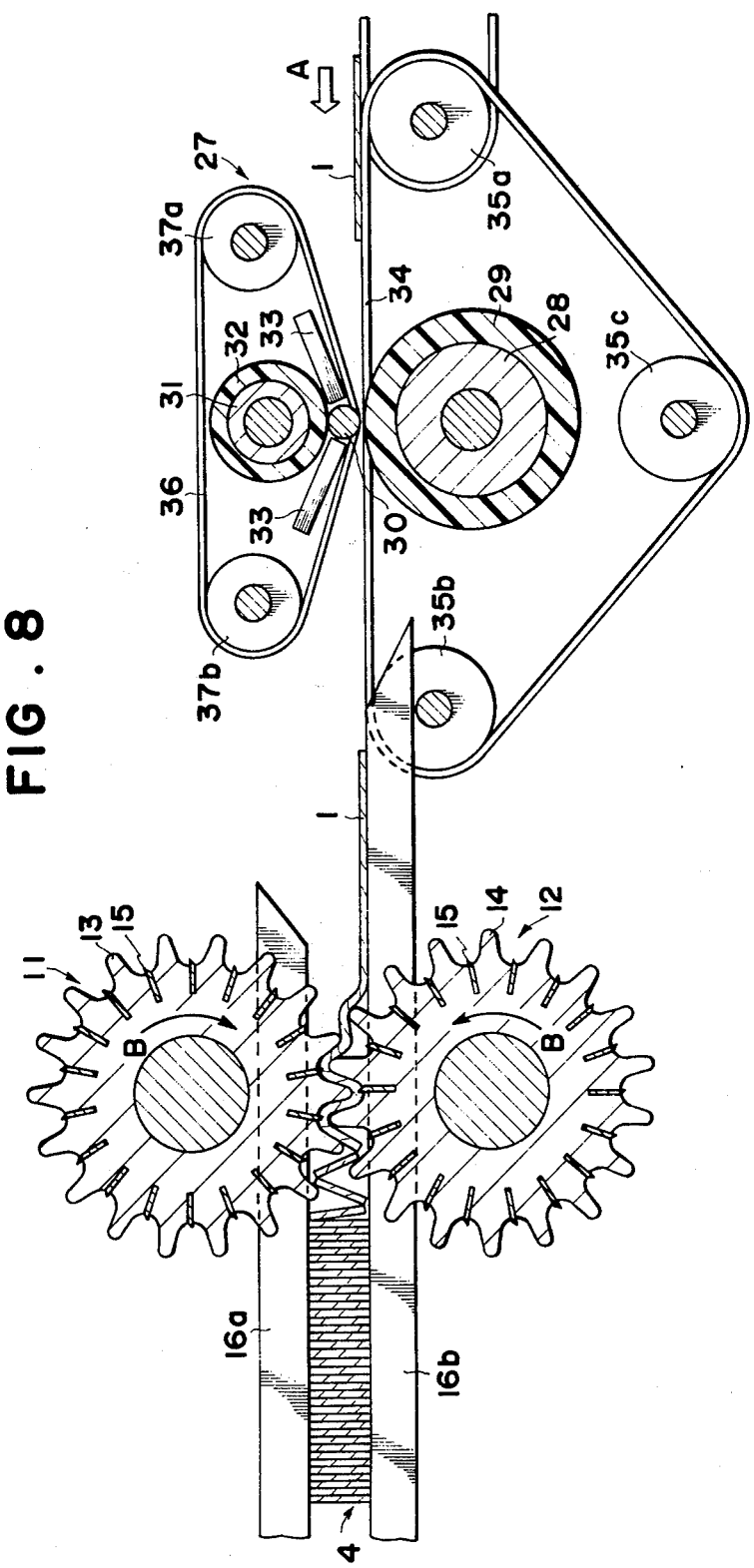

CORE BLOCK FOR PLYWOOD AND METHOD AND APPARATUS FOR FORMING SAME

BACKGROUND OF THE INVENTION

This invention relates to a new plywood core block.

Many kinds of plywood have hitherto been provided afford desired rigidity, hardness, or strength thereto. Among these known types of plywood, there has recently been provided a rigid plywood which comprises a core block having a number of thin and narrow wood strips adhered side by side with their grains arranging in the same direction, and relatively wide backing plates attached to the upper and lower surfaces of the core block.

However, to form a plywood of this type, a number of wood strips have to be cut out of a thin wood sheet to have a predetermined width, and the cut-out wood strips have to be arranged side by side and adhered in close contact with each other. Accordingly, the method for forming the known plywood is not efficient in actual practice due to the cutting and arranging processes.

Further, it is very difficult in the known method to form a core block having desired flexibility, lightness and strength without substantially impairing the rigidity thereof, due to the difficulty of arranging the wood strips with desired spacing therebetween.

Moreover, when the core block for the plywood is formed from a wood sheet which has been cut out of a wood material by means of a veneer lathe or a veneer slicer, irregular shaped front and rear ends of the wood sheet have to be cut away, so that the yield rate of the core block from the wood material is relatively low.

Accordingly, a main object of the present invention is to provide a new plywood core block which avoids the above disadvantages of the known core block.

Another object of the present invention is to provide a new core block for a plywood having desired flexibility and lightness without substantially impairing the rigidity thereof.

A further object of the present invention is to provide a plywood core block which may be easily and effectively formed.

Still another object of the present invention is to provide a plywood core block which may be formed from a wood material at a high yield rate.

BRIEF SUMMARY OF THE INVENTION

A core board for a plywood according to the present invention comprises a thin wood sheet folded in a zig-zag manner to have substantially the same height and provided with cuts partially extending in the wood sheet at the folded outer end portions along the grain direction thereof.

The wood sheet may be folded in such a manner that folded wood sheet portions may closely contact adjacent portions or may form a triangular space between adjacent portions.

According to the present invention, the plywood core block is formed in that thin wood sheet is conveyed in a direction at right angles to the direction of the grain thereof, the wood sheet is shaped into a wave form having a substantially uniform wave-length in the conveying direction, the wood sheet is partially cut at the top and bottom of the wave form along the grain direction thereof, and the wood sheet is folded in a zig-zag manner.

An apparatus for forming a plywood core block according to the invention comprises means for shaping a wood sheet into a wave form having a substantially uniform wave-length while the wood sheet is carried therethrough, means for partially cutting the wood sheet at the top and bottom of the wave form while the wood sheet is carried through the shaping means, and means for restricting free advancement of the wood sheet discharged from the shaping and cutting means to forcedly fold the wood sheet in a zig-zag manner.

Preferably, the shaping means comprises a pair of toothed drums arranged to be engagable with each other to allow the wood sheet to be carried therebetween in the wave form, and the cutting means are knives provided between adjacent teeth of the drums.

The aforementioned and other objects and features of the present invention shall be described hereinafter in detail with reference to preferred embodiments thereof shown in the accompanying drawings, in which:

DESCRIPTION OF THE DRAWINGS

FIG. 6 is a vertical sectional view showing the present apparatus, according to another embodiment thereof, for forming the core block of the type shown in FIGS. 1 and 2, FIG. 7 is a top plan view of the apparatus shown in FIG. 6, and FIG. 8 is a vertical sectional view showing the present apparatus, according to a third embodiment thereof, for forming the core block of the type shown in FIGS. 1 and 2.

DETAILED DESCRIPTION OF THE INVENTION

Figure 1:
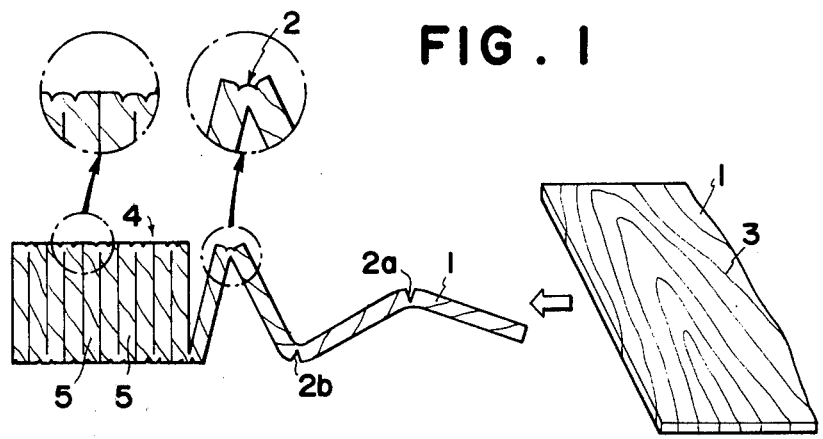
FIG. 1 is an explanatory view showing essential present processes for forming a core block for a plywood.

First of all, description will be made of a core block for a plywood of the present invention with reference to FIG. 1. A thin wood sheet 1 cut out of a wood material to a thickness of 1 mm to 3 mm by means of a veneer lathe or a veneer slicer (not shown) is then provided with a series of cuts or slits 2 at predetermined intervals. The series of slits 2 are alternately provided in the upper and lower side of the wood sheet and extend in the direction of the grains 3, and each slit extends about one-half to two-thirds of the thickness of the wood sheet 1. The interval between an upper slit 2a in the upper side of the wood sheet 1 and an adjacent lower slit 2b in the lower side thereof corresponds to the thickness ($t$) of the core block 4 to be formed. The wood sheet 1 thus provided with the slits 2 is folded in a zig-zag manner along the upper and lower slits 2a and 2b and is compactly arranged such that the folded adjacent wood sheet portions 5 closely contact each other. Preferably, an adhesive is coated on both upper and lower surfaces of the wood sheet 1, so that the core block 4 thus folded is integrally connected. Since the upper and lower slits 2a and 2b are provided at the predetermined intervals, the formed core block 4 has a substantially uniform height or thickness ($t$).

Figure 2:
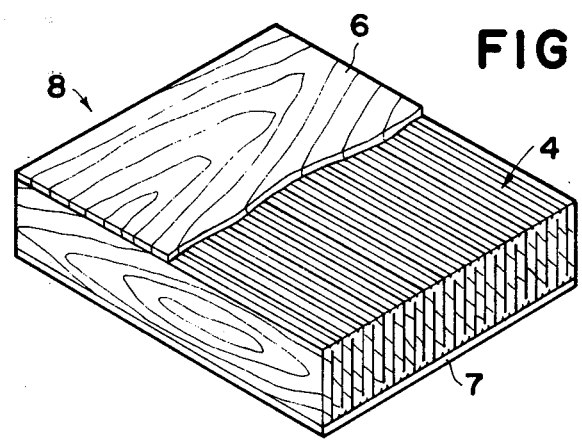
FIG. 2 is a perspective view showing a plywood formed by using the core block formed by the process in FIG. 1.

The core block 4 formed in the manner set forth above is covered at the upper and lower surfaces thereof with backing plates 6 and 7 by means of adhesive and, therefore, a complete plywood 8 is formed as shown in FIG. 2.

Figure 3:
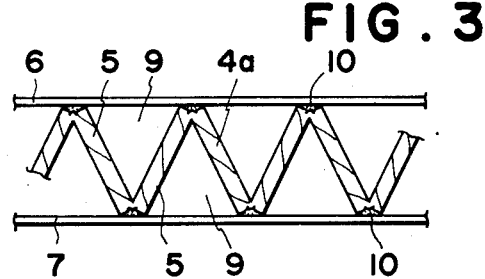
FIG. 3 is a sectional view showing a core block for a plywood according to another embodiment of the present invention.

Shown in FIG. 3 is another type of core block 4a according to another embodiment of the present invention, in which the wood sheet 1 provided with a series of slits 2 in the same way as set forth in FIG. 1 is folded in a zig-zag manner with a triangular space 9 or a bonding material between the adjacent folded wood sheet portions 5. In this embodiment the backing plates 6 and 7 can be adhered to the upper and lower sides of the core block 4a with adhesive 10 filled in the upper and lower slits 2a and 2b of the wood sheet 1.

Figure 4:
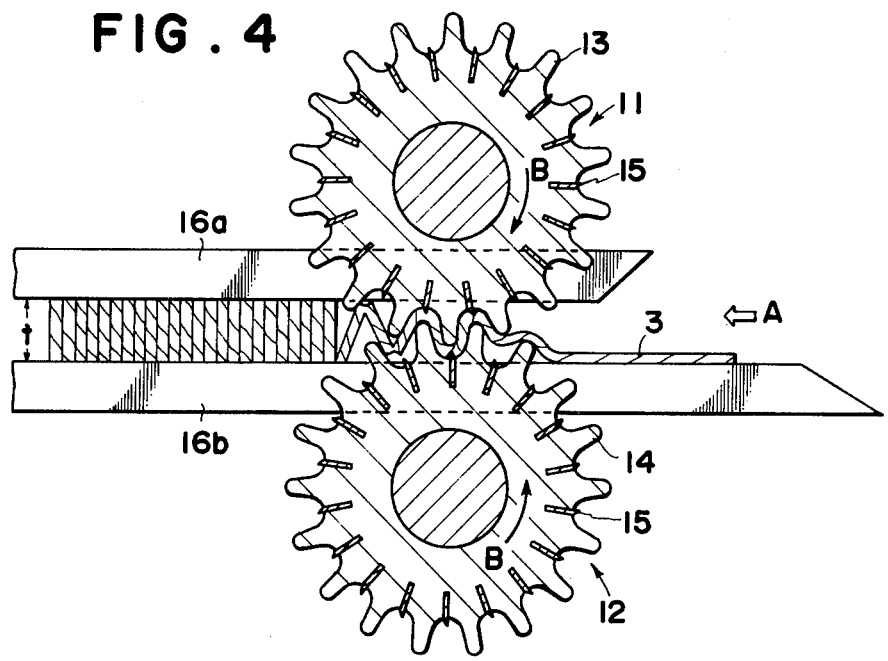
FIG. 4 is a vertical sectional view showing the present apparatus for forming the core block of the type shown in FIGS. 1 and 2.
Figure 5:
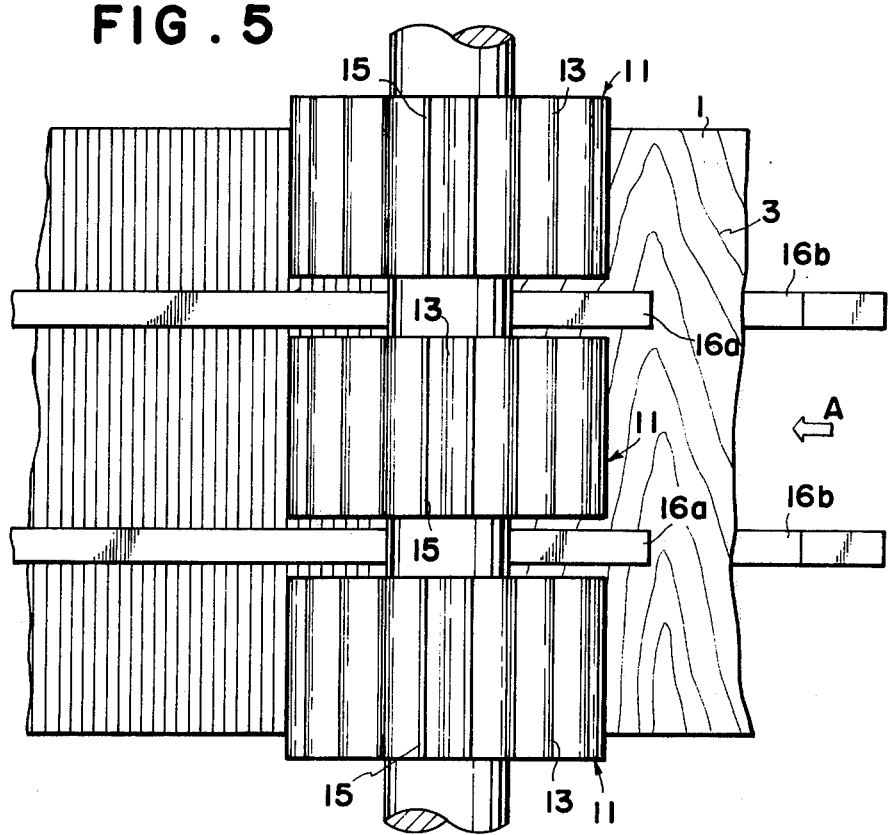
FIG. 5 is a top plan view of the apparatus shown in FIG. 4.

Referring now to FIGS. 4 and 5 which illustrate a practical method and apparatus according to one embodiment of the present invention, the wood sheet 1 is conveyed in the direction shown by an arrow A, which is substantially at right angles with the directions of the grains 3, and is led between vertically aligned upper and lower toothed drums 11 and 12. The teeth 13 and 14 of the upper and lower drums 11 and 12 are engagable with each other at the lower and upper portions thereof, respectively, with a space therebetween corresponding to the thickness of the wood sheet 1. Radially projecting through the toothed drums at portions between each adjacent pair of teeth thereof are cutter blades 15 for forming slits 2a and 2b in the upper and lower surfaces of the wood sheet 1. In such a structure when the toothed drums 11 and 12 are rotated in the opposite directions shown by arrows B, the wood sheet 1, which is thin and flexible, is carried in and caught between the upper and lower toothed drums 11 and 12 and shaped in a wave form with substantially the same wave-length in the conveying direction, because the teeth at the lower and upper portions of the upper and lower drums 11 and 12, respectively, are spaced from each other by an amount corresponding to the thickness of the wood sheet and form a uniform wave form therebetween. While the wood sheet 1 is shaped in the wave form between the toothed drums 11 and 12, the slits 2a and 2b are made in the wood sheet 1 at the top and bottom of the wave form along the direction of the grain thereof by the cutter blades 15 to the depth up to one-half to two-thirds of the thickness of the wood sheet 1.

The wood sheet 1 thus provided with slits 2a and 2b is discharged from the toothed wheels 11 and 12 and led into a space between upper and lower stationary guide rails 16a and 16b. The space ($t$) between the guide rails is made substantially equal to the interval between the adacent upper and lower slits 2a and 2b. A plurality of the paired guide rails 16a and 16b are disposed at right angles to the axes of the toothed drums in such a manner that the fore end (right end in FIG. 4) of each projects beyond the toothed drums for smoothly introducing the wood sheet 1 in the space between the toothed drums 11 and 12. The slitted wood sheet led or discharged into the space between the upper and lower stationary rails 16a and 16b is restricted from free advancement and is advanced only by a pushing force applied thereto by the successively supplied slitted wood sheet 1 in the wave form. Accordingly, the slitted wood sheet 1 is folded in a zig-zag manner with the folded wood sheet portions 5 being upright and closely in contact.

Although the guide rails 16a and 16b set forth above are made stationary, they may be movable at a speed slow enough to allow the zig-zag arrangement of the slitted wood sheet.

The guide rails 16a and 16b may be heated plates for rapid drying of the folded wood sheet.

When it is desired to form a core block of light, flexible and coarse structure in which a triangular-shaped space 9 is formed between the adjacent folded wood sheet portions 5 as shown in FIG. 3, the guide rails 16a and 16b are made at a relatively high speed.

Shown in FIGS. 6 and 7 is another embodiment of the present apparatus in which the folded wood sheet portions 5 are firmly combined together by adhesive.

In the apparatus shown in FIG. 6, relatively high speed conveyor means 17 and a relatively low speed conveyor means 21 are provided in series and in that order at the rear end portion (left side in FIG. 6) of the guide rails 16a and 16b. The high speed conveyor means 17 comprises upper endless belts 18a each wound around paired rotary bodies 19a and 19a', and lower endless belts 18b each wound around paired rotary bodies 19b and 19b', in which the upper and lower rotary bodies 19a and 19b are connected with the axes of the toothed drums 11 and 12 through a known speed change means 20. The low speed conveyor means 21 comprises upper endless belts 22a each wound around paired rotary bodies 23a and 23a', and lower endless belts 22b each wound around paired rotary bodies 23b and 23b', in which the upper and lower rotary bodies 23a' and 23b' are connected with the axes of the toothed drums 11 and 12 through another speed change means 24. The upper endless belts 18a and 22a are spaced from the lower endless belts 18b and 22b by the height ($t$) equal to that of the space between the upper and lower guide rails 16a and 16b. As is shown in FIG. 7, the rotary bodies 19a' of the high speed conveyor means 17 and the rotary bodies 23a of the low speed conveyor means 21 are disposed alternately in the axial direction of the rotary drums.

Upper sprayers 25 for adhesive are disposed between the endless belts 18a—18a and also lower sprayers 26 for adhesive are disposed between the endless belts 18b—18b.

The other remaining features of this apparatus are substantially same as those of the first embodiment set forth with reference to FIGS. 4 and 5.

In such a structure of the second embodiment shown in FIGS. 6 and 7, the slitted wood sheet 1 is advanced through the space between the guide rails 16a and 16b to the space between the endless belts 18a and 18b of the high speed conveyor means 17. When the slitted and folded wood sheet 1 reaches the space between the endless belts 18a and 18b, the endless belts 18a and 18b stretch the folded wood sheet 1 from the space between the guide rails 16a and 16b to form a triangular space between the adjacent folded wood sheet portions 5 and conveys it in such a stretched state. While the folded wood sheet 1 is in the stretched state, adhesive is sprayed into the triangular spaces of the folded wood sheet from the upper and lower sprayers 25 and 26, so that the upper and lower surfaces of the folded wood sheet are coated with the adhesive. In the further advancement of the folded wood sheet, when it comes close to the slow speed conveyor means 21, the advancing speed thereof is gradually lowered and, therefore, the folded wood sheet portions 5 become gradually more upright as they advance. Then, in the space between the upper and lower endless belts 22a and 22b of the slow speed conveyor means 21, the folded wood sheet portions 5 are arranged completely upright and are brought into close contact with adjacent portions. Accordingly, the folded wood sheet portions, on each of which the adhesive is coated, are integrally combined while they are discharged from the low speed conveyor means 21.

The belts 18a—18b and 22a—22b of the high and low speed conveyor means 17 and 21, respectively, may be made long enough to harden the adhesive, sprayed on both surfaces of the folded wood sheet, while the latter is conveyed by these endless belts. Preferably, heating means may be provided adjacent to the sprayers 25 and 26 for rapidly drying the sprayed adhesive, and the adhesive may be heatsetting adhesive. When the heating means is used together with a heatsetting adhesive, the lengths of the endless conveyor belts may be reduced. The heating means may be a hot air sprayer, a heated plate, a high-frequency heating device, a microwave heating device or other known heating devices.

Reference is now made to an apparatus shown in FIG. 8 according to a third embodiment of the present invention. In this apparatus, roller means 27 are provided at the feeding side of the toothed drums 11 and 12 for making the wood sheet flexible before it is shaped in the wave form. The roller means 27 comprises a lower roller 28 having a relatively large diameter and coated with a rubber layer 29, a roller bar 30 of small diameter vertically aligned with the axis of the lower roller 28 and positioned above the latter with a narrow space therebetween, a back roller 31 coated with a resilient material 32 such as rubber and adapted to vertically and downwardly press the roller bar 30 against the rubber layer 29 of the lower roller 28, and a pair of guide bars 33 disposed on both sides of the roller bar 30 and adjacent thereto.

A feed conveyor belt 34 is provided around three rollers 35a–35c which are arranged in a triangular form with the upper two rollers 35a and 35b on the same level. The top circumferencial surface of the rubber layer 29 of the lower roller 28 is arranged on the same horizontal level as the top circumferencial surfaces of the upper two rollers 35a and 35b and the upper surface of the lower guide rail 16b. An endless belt 36 is also provided above the feed conveyor belt 34 and disposed around two upper rollers 37a and 37b and the lower roller bar 30.

Usually, when the wood sheet 1 is cut out of a wood material by means of a veneer lathe or veneer slicer, small incisions are formed on the back surface of the wood sheet along the direction of the grain. Accordingly, the wood sheet 1 cut out of the wood material is curled with the back surface thereof being the outer curled surface and having flexibility in the curled direction.

The roller means 27 of the third embodiment is provided to form fine cracks on the front surface of the wood sheet 1 and, thereby, to afford flexibility in both the curled and uncurled directions thereof for easy bending and folding in the subsequent shaping and folding processes. That is, when the wood sheet 1 having small incisions on the upper surface thereof is carried by the feed conveyor belt 34 to a position between the roller bar 30 and lower roller 28 where the roller bar 30 is pressed against the rubber layer 29 of the lower roller 28 by an air cylinder (not shown) or a similar device acting on the backing roller 31, the wood sheet 1 is forcedly bent or curled upwardly due to the difference of curvatures of the roller bar 30 and the rubber layer 29 of the lower roller 28, so that fine cracks are formed on the lower surface of the wood sheet 1 along the direction of the grain. The wood sheet 1 thus carried through the roller means 27 is provided with small incisions and fine cracks on the upper and lower surfaces thereof and, thereby, it becomes very flexible for shaping in the wave form in the subsequent process.

The other remaining features of the apparatus according to the third embodiment are substantially the same as those of the first embodiment shown in FIG. 4.

As is apparent from the description set forth above, according to the present invention, a core block for the plywood is continuously formed from a wood sheet and, therefore, the production efficiency thereof is remarkably improved compared with known methods.

Also, it becomes very easy in the present invention to form a core block for the plywood which has desired rigidity, flexibility, or lightness, because the wood sheet portions folded in a zig-zag manner can be arranged to closely contact each other or to form a desired triangular space between adjacent portions.

Further, as the present core block for the plywood is formed by folding the wood sheet in a zig-zag manner, irregularly shaped front and rear edge portions of the wood sheet can be used without cutting off these edge portions, so that the yield rate of the core block is improved.

Further, in the core according to the present invention, the folded wood sheet portions are continuously connected by way of the folded end portions, so that present core block has high strength.

Although the present invention has been described with reference to preferred embodiments thereof, many modifications and alterations may be made without departing from the scope of the present invention.

What is claimed is:

1. A plywood core block comprising a single thin flat wood sheet having slits therein extending in the direction of the grain thereof, said slits being substantially equally spaced and defining therebetween wood portions, said slits being alternately formed in oposite surfaces of said sheet, each of said slits having a depth equal to from one-half to two-thirds the thickness of said sheet, said sheet being folded at said slits in a zig-zag manner, with adjacent of said sheet portions adhered together by adhesive in close side-by-side contact, thus forming an integral and rigid core block, the heights of all of the thus folded sheet portions being equal.

* * * * *